US007451388B1

(12) United States Patent
Henzinger et al.

(10) Patent No.: US 7,451,388 B1
(45) Date of Patent: Nov. 11, 2008

(54) RANKING SEARCH ENGINE RESULTS

(75) Inventors: Monika R. Henzinger, Menlo Park, CA (US); Michael D. Mitzenmacher, Belmont, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/392,170

(22) Filed: Sep. 8, 1999

(51) Int. Cl.
*G06F 17/00* (2006.01)

(52) U.S. Cl. .................. 715/208; 715/206; 715/209; 707/3

(58) Field of Classification Search .............. 707/501.1, 707/3, 2, 4, 6, 103; 715/501.1, 513, 208, 715/206, 209
See application file for complete search history.

(56) References Cited

U.S. PATENT DOCUMENTS

| | | | | |
|---|---|---|---|---|
| 5,848,407 A * | 12/1998 | Ishikawa et al. | ................ | 707/2 |
| 5,950,189 A * | 9/1999 | Cohen et al. | .................... | 707/3 |
| 6,119,124 A * | 9/2000 | Broder et al. | ........... | 707/103 R |
| 6,272,507 B1 * | 8/2001 | Pirolli et al. | ................ | 707/513 |
| 6,285,999 B1 * | 9/2001 | Page | ............................. | 707/5 |
| 6,370,527 B1 * | 4/2002 | Singhal | ......................... | 707/6 |
| 6,457,028 B1 * | 9/2002 | Pitkow et al. | ............... | 715/513 |
| 6,490,579 B1 * | 12/2002 | Gao et al. | ....................... | 707/4 |

OTHER PUBLICATIONS

Henzinger et al. "Measuring index quality using random walks on the web" May 17, 1999, Computer Networks, vol. 31, pp. 1291-1303.*

Carrière, J., and Kazman, R., "Webquery: Searching and Visualizing the Web through Connectivity," Proceedings of the Sixth International World Wide Web Conference, Santa Clara, California, pp. 701-711, Apr. 1997.

Bharat, K., and Broder, A., "A Technique for Measuring the Relative Size and Overlap of Public Web Search Engines," Proceedings of the 7th International World Wide Web Conference, Brisbane, Australia, pp. 379-399, Elsevier Science, Apr. 1998.

Bharat, K., Broder, A., Henzinger, M., Kumar, P., and Venkatasubramanian, S., "The Connectivity Server: Fast Access to Linkage Information on the Web," Proceedings of the 7th International World Wide Web Conference, Brisbane, Australia, pp. 469-477, Elsevier Science, Apr. 1998.

Brin, S., and Page, L., "The Anatomy of a Large-Scale Hypertextual Web Search Engine," Proceedings of the 7th International World Wide Web Conference, Brisbane, Australia, pp. 107-117, Elsevier Sciense, Apr. 1998.

Cho, J., Garcia-Molina, H., and Page, L., "Efficient Crawling Through URL Ordering," Proceedings of the 7th International World Wide Web Conference, Brisbane, Australia, pp. 161-172, Elsevier Science, Apr. 1998.

Page et al., "The PageRank Citation Ranking: Bringing Order to the Web," pp. 1-17, Jan. 29, 1998.

Tim Bray, "Measuring the Web," Fifth International World Wide Web Conference, May 6-10, 1996, Paris, France, pp. 1-7.

* cited by examiner

*Primary Examiner*—Stephen Hong
*Assistant Examiner*—Matthew J Ludwig

(57) ABSTRACT

A method, system, and computer program product for determining relative quality of search engine indexes and search results include performing a two-level random walk through a hypertext-linked document set. Search engine index quality is measured based on the number of encountered documents that are indexed by the search engine index. Search result quality is measured based on the number and quality of documents that link to the result document.

55 Claims, 5 Drawing Sheets

RANKING SEARCH ENGINE RESULTS

BACKGROUND OF THE INVENTION

1. Field of the Invention

The present invention relates generally to search engines, and more particularly to a system and method of evaluating and ranking search engines and their results.

2. Description of Background Art

With the ever-growing size and popularity of the World Wide Web has come an increasingly difficult challenge: providing users with high-quality mechanisms for searching and navigating an enormous and diverse quantity of information. Users attempting to locate information on the Web often begin by running a search on one of several freely-available search engines, such as those found at "www.yahoo.com", "www.infoseek.com", and the like. Such search engines generally perform some form of keyword search on web documents, and return a list of "hits" representing pages or websites having information relevant to the keyword.

Often, the number of hits returned is very large, and the user is faced with the burdensome task of trying to determine which, if any, of the hits may lead to useful information. Some search engines attempt to rank the hits in order to provide some guidance as to which are more likely to be useful. Such ranking may be based, for example, on the relative prominence of the keyword within the web page, or the number of occurrences of the keyword within the web page. However, it has been found that such ranking techniques are often unreliable, as they do not accurately reflect the relative quality of a particular web page or website.

The relative quality of a web page has been found to be an effective predictor of whether the page will be relevant or useful to a search. Since the World Wide Web is so diverse, with virtually anyone being able to publish pages at will, there is a wide range of quality of pages on the Web. Some pages may be published by large commercial entities with journalistic standards and fact-checking or by academic institutions with scrupulous review procedures, while others may be published by individuals with no quality control, and with no inclination or capability to verify the information being posted. In addition, many web pages employ attention-getting strategies specifically designed to manipulate the page's relative rank in conventional search engines. Since such techniques may be employed by any web page at will, conventional search engines have difficulty assessing relative quality without being given extraneous information regarding the publisher of particular pages and websites.

Quality of a website, while necessarily a subjective term, can however be measured. Page et al. [1], "The PageRank Citation Ranking: Bringing Order to the Web", January 1998, describes a "PageRank" method for measuring the relative importance (or quality) of web pages in order to provide a ranking system based on an objective criterion. In essence, PageRank is a recursive technique which ranks a page based on the sum of the ranks of the pages that link to it. Thus, a page that is linked to by a large number of pages tends to be ranked relatively highly, particularly if the linking pages are themselves of high rank. As a precursor to developing PageRank measurements, Page et al. [1] performs a random walk through the Web by following successive links on pages.

However, the PageRank technique suffers from a number of disadvantages. Pages that are part of a large commercial site often contain massive amounts of internal links, to and from other pages within the same site. Such a situation may unduly skew the PageRank results in favor of such pages. Results so ranked may provide the user with a large number of hits from one monolithic source, rather than a diverse array of useful search results. In addition, implementation of Page et al. [1]'s technique involves an initial mapping of the entire document space being indexed, potentially the entire World Wide Web, a substantially daunting and time-consuming task. If the entire document space is not indexed, the PageRank measure may be an inaccurate approximation based on the sub-graph of pages actually indexed.

In addition, users are often faced with a decision as to which of several distinct web search engines to use for a particular search. Various search engines and their associated indexes are themselves of varying degrees of quality, depending on how likely they are to return a result that will be of use to the user. Thus, an overall assessment of the quality of a search engine index as compared with other search engine indexes may offer guidance to a user as to which to use for a particular search.

Traditionally, search engine indexes have been compared with one another based on the size, or number of pages, they contain or index. Such a measure may be of some use, particularly in the context of advertising for a search engine, as size is sometimes considered to be an indicator of retrieval performance for the end user. See, for example, K. Bharat and A. Broder, "A Technique for Measuring the Relative Size and Overlap of Public Web Search Engines", in *Proceedings of the 7th International World Wide Web Conference*, Brisbane, Australia, April 1998, pp. 379-88. However, size of the search engine index is at best a crude indicator of performance, as it fails to take into account the relative quality of the pages that are retrieved by the search engine, which has been found to be of greater importance than the number of pages retrieved.

What is needed is a system and method for ranking search engine indexes and search results, which avoids the above-referenced deficiencies and facilitates retrieval of a diverse collection of high-quality documents. What is further needed is a ranking system and method which does not require mapping out of the entire document space prior to operation. What is further needed is a ranking system and method which avoids the above-referenced problems in comparing pages from a large site containing many internal links with pages from smaller sites. What is further needed is a ranking system and method which measure search engine index quality in an objective manner that considers relative quality of retrieved pages.

SUMMARY OF THE INVENTION

In accordance with the present invention, there is provided a system and method of measuring and ranking search engine results based on relative quality. The present invention can be used to generate a ranked order of results for a particular search, as well as to perform a comparison of overall quality of a number of search engine indexes.

The present invention employs a two-level random walk in order to generate an improved measure of page quality. In traversing the document space, the present invention treats all pages within a particular grouping (such as a website) as belonging to one node. Selection of the next destination in the random walk is determined first at the node level, and then a particular page within the node is selected. By traversing the document space in this manner, the present invention generates a measurement of quality that is more likely to be based on the number of outside back-links rather than to be skewed by an excessive number of back-links originating within the same website. Thus, documents belonging to large commercial websites having many internal links are not given an unfair advantage in the page ranking.

Search engine index quality can be measured by determining what percentage of documents encountered on the random walk are indexed by the search engine. Document quality can be measured by determining how many times a document is encountered during the random walk; in other words, the more time the random walk spends at a particular document, the higher the relative quality of that document.

The present invention offers other advantages as well. Selected nodes can be treated distinctly from other nodes, depending on some characterization of their relative importance. Thus, a particular node might be excluded from the quality measurement for some reason, or another node might be given greater weight.

In addition, the present invention is able to start measuring the quality of pages without necessarily mapping the entire document space. By employing a random walk, the present invention can determine an approximation of page rank measurement using data for visited pages. Thus, the requirement for advance mapping of the document space is avoided, and searches and page rankings can begin more quickly.

DETAILED DESCRIPTION OF THE PREFERRED EMBODIMENTS

For illustrative purposes, the following description presents the invention in the context of web pages and websites that form part of the World Wide Web. However, it will be apparent to one skilled in the art that the present invention can be applied to any set of documents or files residing within a document space or other collection of data. Accordingly, the pre-sent invention should not be considered to be limited to a web-based implementation. In addition, the words "page" and "document" are used interchangeably in the context of this invention, to denote any distinct file, entity, or item containing data.

The present invention generates a measure of the quality of a search engine result, both in terms of an individual result for comparison with other results in connection with a particular query, and in terms of the overall quality of a search engine index in comparison with other search engine indexes. Thus, the present invention can be applied, for example, to rank the results of a particular search, as well as to rank the relative quality of several search engine indexes.

For broad queries, a measure of the quality of search engine results can be of significant value. Conventionally, users are often presented with a large number of results (or "hits") for such queries, and are at a loss as to which results to explore first. By providing a measurement of search result quality measurement, the present invention attempts to determine which hits are most likely to be relevant to the user, so as to increase the effectiveness and efficiency of searches.

In one embodiment, the present invention employs a page quality measurement known as the PageRank ranking, as described in S. Brin et al., "The Anatomy of a Large-Scale Hypertextual Web Search Engine", in *Proceedings of the 7th International World Wide Web Conference*, Brisbane, Australia, pp. 107-17, April 1998. PageRank develops a measurement of the quality of the page based on the number of other pages that link to that page. In another embodiment, the present invention employs an improved version of the PageRank measurement, as described below.

In the World Wide Web, and in other hyperlinked document sets, most pages contain links to other pages. If page A links to page C, then page C is said to be a "back-link" of page A. Thus, the number of back-links of a page, also known as the "InDegree" of the page, is a measure of the number of other pages that point to that page. Generally, pages having a large number of back-links, i.e. a high "InDegree", are considered more important or of higher quality than other pages.

Figure 3:
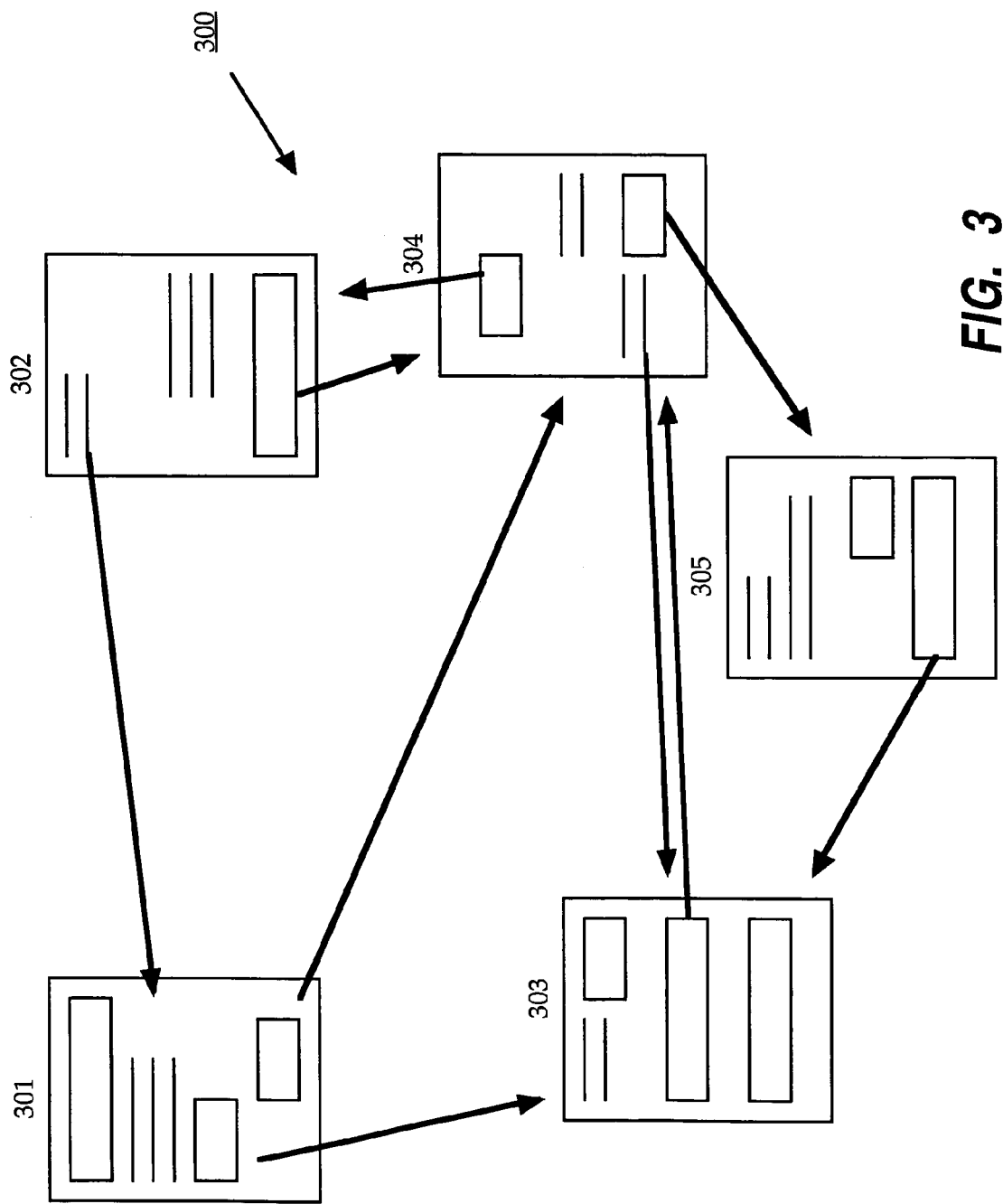
FIG. 3 is an example of a hyperlinked document set.

Referring now to FIG. 3, there is shown an example of a hyperlinked document set 300 containing five documents 301-305 illustrating the concepts of back-links and "InDegree". Document 301 contains links pointing to documents 303 and 304, so that document 301 is considered to be a back-link of documents 303 and 304. Similarly, document 302 points to documents 301 and 304, document 303 points to document 304, document 304 points to documents 302, 303, and 305, and document 305 points to document 303. The InDegree of each document can be determined by counting the number of back-links it contains; thus, documents 301, 302, and 305 have InDegree of 1, while documents 303 and 304 have InDegree of 3.

Furthermore, as described in Brin et al., PageRank extends this idea by not counting links from all pages equally, and by normalizing by the number of links on a page. A formal definition of the improved PageRank measure as employed in one embodiment of the present invention will be provided below. Intuitively, PageRank approximates the behavior of a "random surfer" who begins at a random web page and continues to click on links in the page, occasionally starting on another random web page. A probability known as a "damping factor" d is defined, specifying the likelihood that the random surfer will request a random page instead of following a link. Generally, then, a page can be given a high PageRank if many other pages point to it, or if there are some pages that point to it and themselves have a high PageRank.

The present invention extends and improves the PageRank concepts in several ways, as will be described below.

Random Walks

In one embodiment, the present invention derives a measurement of page quality by performing a random walk. If $X=\{s_1, s_2, \ldots, s_n\}$ is a set of states, a random walk on X corresponds to a sequence of states, one for each step of the walk. At each step, the walk switches from its current state to a new state or remains at the current state. Random walks are usually Markovian, which signifies that the transition at each step is independent of the previous steps and depends only on the current state.

One embodiment of the present invention utilizes a Markovian random walk on the document set (such as the web), where each page in the document set represents a possible state. For a set of hyperlinked documents, a natural way to move between states is to follow a hyperlink from one page to another.

The equilibrium distribution of the walk is defined as, for each state, the fraction of the steps the random walk would spend in the state if the random walk continued for an infinite amount of time. In most well-behaved walks, the probabilities given by the equilibrium distribution are very closely approximated by the probabilities that one finds a random walk in a given state at some point far, but finitely far, in the future.

Page Quality Measurement

The present invention employs a definition of quality of a search engine index as follows. If each page p of the document set is given a weight w(p), with the weights being scaled so that the sum of all weights is 1, the quality of a search engine index S can be defined as:

$$w(S) = \sum_{p \in S} w(p) \qquad \text{(Eq. 1)}$$

Regardless of the choice of w, according to the above definition the quality of a search engine index is to some extent related to its size. In particular, if the pages indexed by a search engine index $S_1$ are a subset of the pages indexed by a search engine index $S_2$, then $S_2$ will have at least as large a quality score as $S_1$ by the above criterion. Thus, a second metric, the average page quality of a search engine index, may be employed, defined as:

$$A(S) = w(S)/|S| \qquad \text{(Eq. 2)}$$

where |S| is the number of pages indexed by search engine index S.

The average page quality provides an indication of how well a search engine index selects pages to index. However, large search engine indexes are at a disadvantage, since the more pages an index contains, the more difficult it will be to keep the average page quality high.

Average page quality also provides a measurement of relative quality of search results within a particular search engine index, and thus may be used for ranking results returned by a search engine, as will be seen below.

In one embodiment, the present invention utilizes an improved version of the PageRank measure for page quality. As described in Brin et al., the PageRank measure is a quality metric that takes into account not only the number of pages that reference a page, but also the PageRank of the referencing pages as well. This recursive definition provides for a measurement that is in accord with the intuitive concept that links from a high-quality page should be given more weight than links from a low-quality page.

A formal definition of PageRank may be expressed as follows:

$$R(p) = d/T + (1-d) \sum_{i=1}^{k} R(p_i)/C(p_i) \qquad \text{(Eq. 3)}$$

where:

T is the total number of pages in the document set;

d is a damping factor such that 0<d<1, with a typical value between, for example, 0.1 and 0.15, though any value might be used;

pages $p_1, \ldots, p_k$ link to page p;

R(p) is the PageRank of p; and

C(p) is the number of links out of p.

R(p) can be scaled so that the sum of all R(p) is 1, in which case R(p) can be thought of as a probability distribution over pages and hence a weight function.

As discussed above, PageRank (and the improved version described herein) may be interpreted in terms of the behavior of a "random surfer" who follows links and periodically (depending on the damping factor) selects a random page. The equilibrium probability that such a surfer is at page p is given as R(p). Thus, pages with high rank are more likely to be visited than pages with low rank.

Search Engine Index Quality

In one embodiment, the present invention develops a measurement of search engine index quality by independently selecting pages $p_1, p_2, p_3, \ldots, p_n$ in the document set and testing whether each selected page is indexed by the search engine index S. Thus, if the sequence of pages $p_1, p_2, p_3, \ldots, p_n$ is the sample sequence, and if $I[p_i \epsilon S]$ is 1 if page $p_i$ is indexed by S, and 0 if not, then an estimate for search engine index quality is given as:

$$\overline{w}(S) = \frac{1}{n} \sum_{i=1}^{n} I[p_i \in S] \qquad \text{(Eq. 4)}$$

Thus, the quality of the search engine index is approximated by the fraction of pages in the sample sequences that is indexed by S. Furthermore, the expectation of each $I[p_i \epsilon S]$ is given by w(S), as follows:

$$E(I[p_i \in S]) = \sum_{p \in S} Pr(p_i = p) = \sum_{p \in S} w(p) = w(S) \qquad \text{(Eq. 5)}$$

Thus, $\overline{w}(S)$ is the average of several independent binary random variables, each taking the value 1 with probability w(S), which implies that:

$$E(\overline{w}(S)) = \frac{1}{n} \sum_{i=1}^{n} E(I[p_i \in S]) = w(S) \qquad \text{(Eq. 6)}$$

Thus, the present invention estimates the quality of a search engine index, as well as its results, by selecting pages according to w, and testing whether each selected page is indexed by the search engine index.

In one embodiment, the present invention tests whether a page is indexed by a search engine index as follows. Using a list of words that appear in documents and an approximate measure of their frequency, the invention finds the k rarest words that appear in each document, where k is any number (such as, for example, 9). The search engine is then queried using a conjunction of these k rarest words, and the results are checked to determine whether they include the page. See, for example, Bharat et al.

Figure 1:
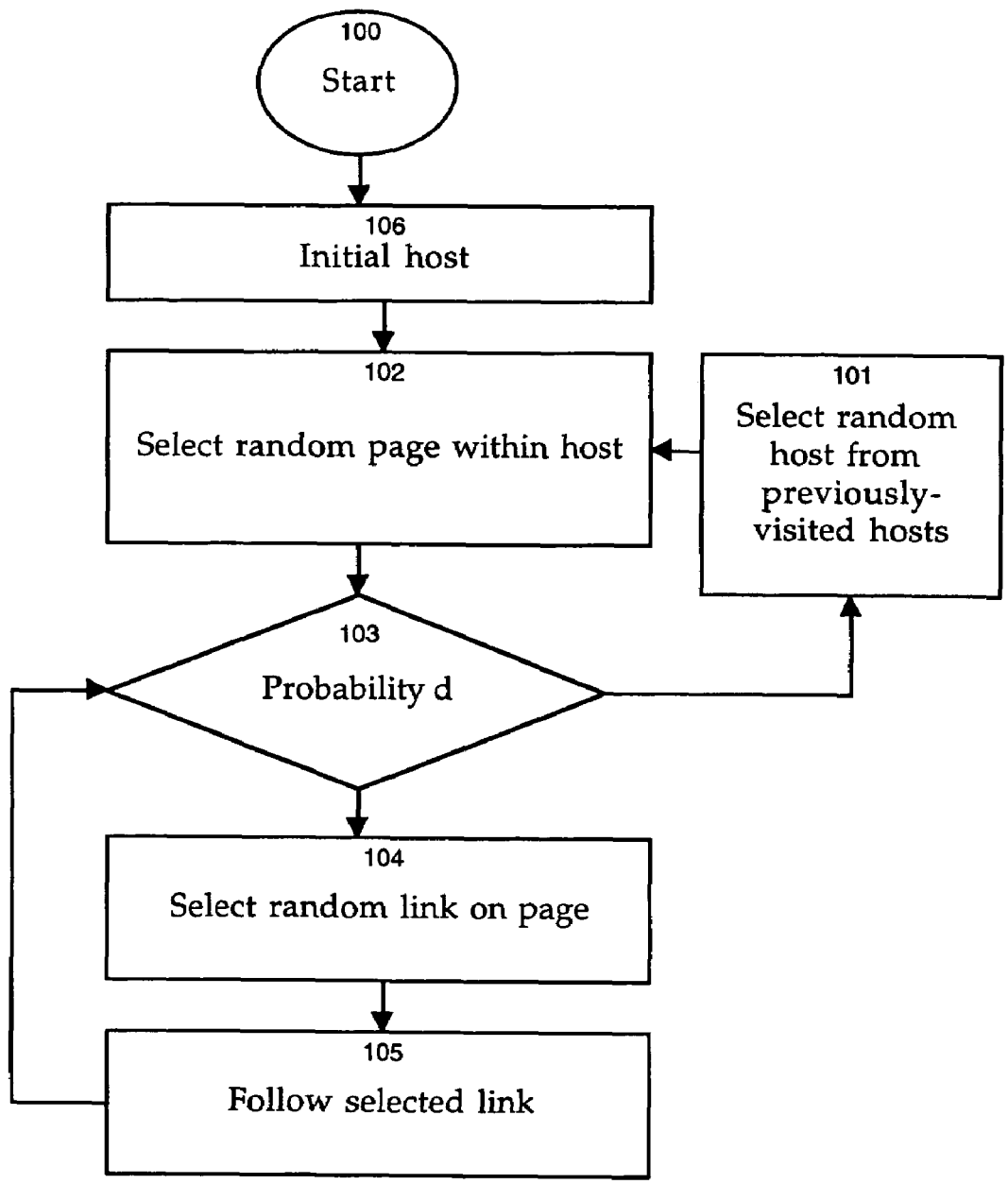
FIG. 1 is a flowchart of a random walk method of sampling pages according to one embodiment of the present invention.

Referring now to FIG. 1, there is shown a flowchart of a method of sampling pages according to one embodiment of the present invention.

The walk begins with an initial host 106 and random selection 102 of a page within the host. At each step in the random walk, the present invention decides 103 randomly (based on the damping factor) whether to follow a link on the current page or to select a random new page. If following a link, the invention selects 104 a link on the current page and follows it 105 (i.e. retrieves a page corresponding to the link). If selecting a random new page, the invention selects 101 a host uniformly at random from the set of hosts encountered on the walk so far, and selects 102 a page chosen uniformly at random from the set of pages discovered on that host thus far.

If, however, a page with no outgoing links is encountered, the page and its host are not recorded, so that the walk is not restarted at a dead end. The loop of FIG. 1 may be repeated until all pages have been traversed, or more likely until some predetermined condition is reached.

The two-level (host, then page) random walk method of FIG. 1 has been found to increase the spread of the walk in comparison with prior art methods, reducing the bias in favor of hosts having large numbers of interconnected pages.

Figure 4:
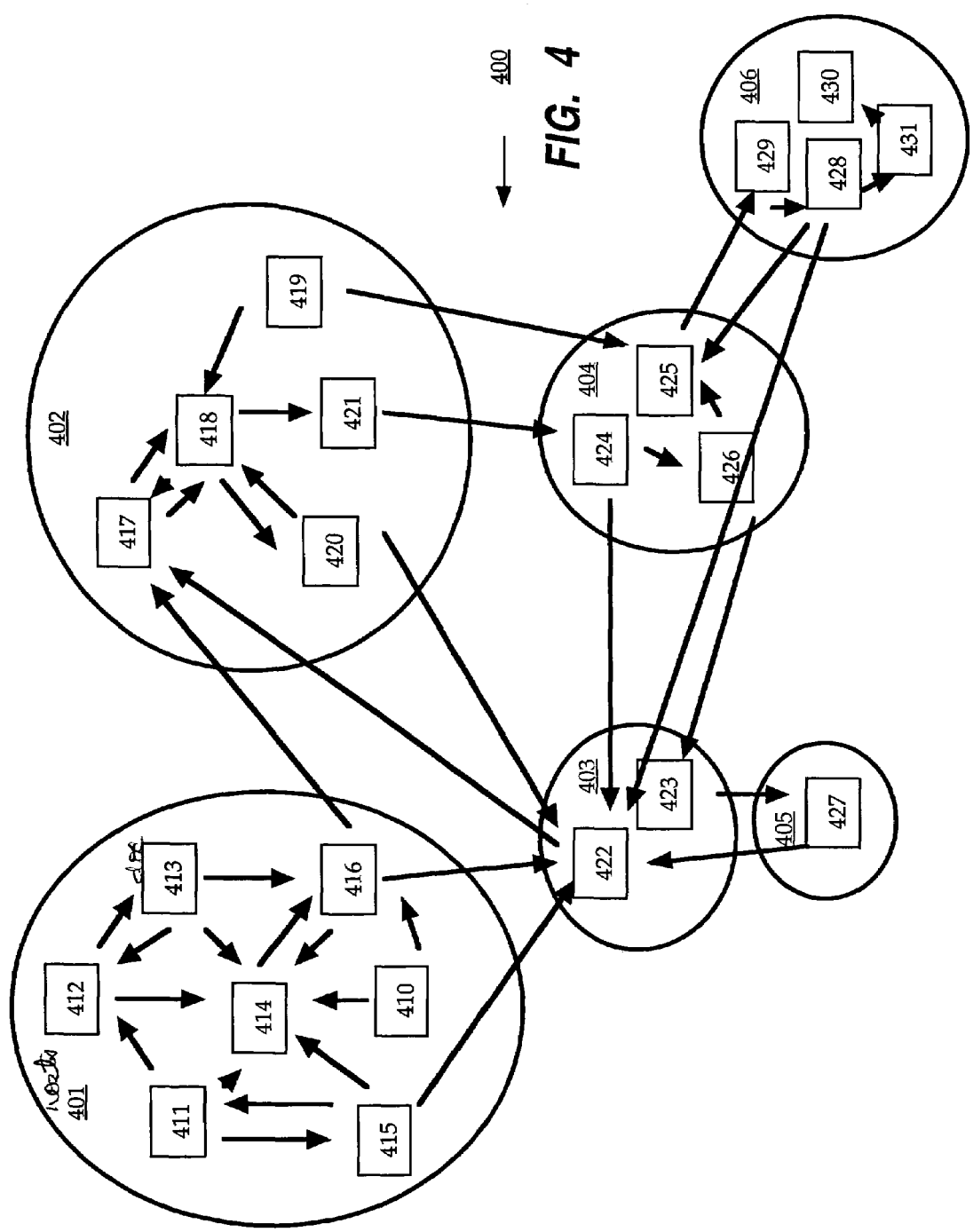
FIG. 4 is an example of a hyperlinked document set containing hosts of varying sizes.

Referring now to FIG. 4, there is shown an example of a hyperlinked document set 400 containing hosts 401-406 of varying sizes, each host containing one or more documents. Host 401, for example, contains a relatively large number of interconnected documents 410-416, while host 403 contains just two documents 422 and 423. According to prior art methods, a document such as 414, having an InDegree of 6, would be ranked approximately equal to document 422, also having an InDegree of 6 (subject to adjustment based on the InDegrees of the referring documents). The present invention would take into account the fact that document 414 belongs to a large intra-host 401, and that the back-links of document 414 come from documents within the same host 401, while the back-links of document 422 come from documents from various hosts. Thus, the relative quality of document 422 is likely to be higher. The two-level random walk method reduces the bias in favor of documents in large hosts such as 401, by reducing the amount of time spent traversing links within a single host and thereby increasing the spread of the walk.

In one embodiment, the present invention keeps track of all visited pages (and their associated hosts) for the purpose of performing a random jump to a previously-visited page. This information may be stored, for example, in random-access memory (RAM) or on secondary storage such as a disk. In an alternative embodiment, a limited number of pages is recorded, such as for example the most recently visited 100,000 pages. In yet another embodiment, only a subset of visited pages are recorded, using a probabilistic sampling method. Such alternative techniques may serve to reduce the storage burden associated with recording all visited pages.

It has been found that any bias resulting from selection of the initial host and page within that host is substantially reduced or eliminated after a sufficiently large number of steps in the walk have been completed. In one embodiment, the first steps in the walk are discarded, so as to reduce such a bias even further. Alternatively, the damping factor can be decreased for early steps in the walk, so as to increase the likelihood that links will be followed rather than attempting to randomly select among relatively few hosts.

One embodiment of the present invention performs random walks using Mercator, an extensible, multi-threaded web crawler written in the Java programming language. In one embodiment, a number of random walks can be conducted in parallel, each walk running in a separate thread of control. When a walk randomly jumps to a page instead of following a link, it can choose a host uniformly at random from all hosts seen by any thread thus far, and then choose a page on that host uniformly from all pages on that host seen by any thread so afar.

In one embodiment, a "host" is defined as a domain containing a set of pages, such as for example "www.yahoo.com". However, depending on the nature of the document set, "host" may be defined as any collective group or set of documents.

Figure 2:
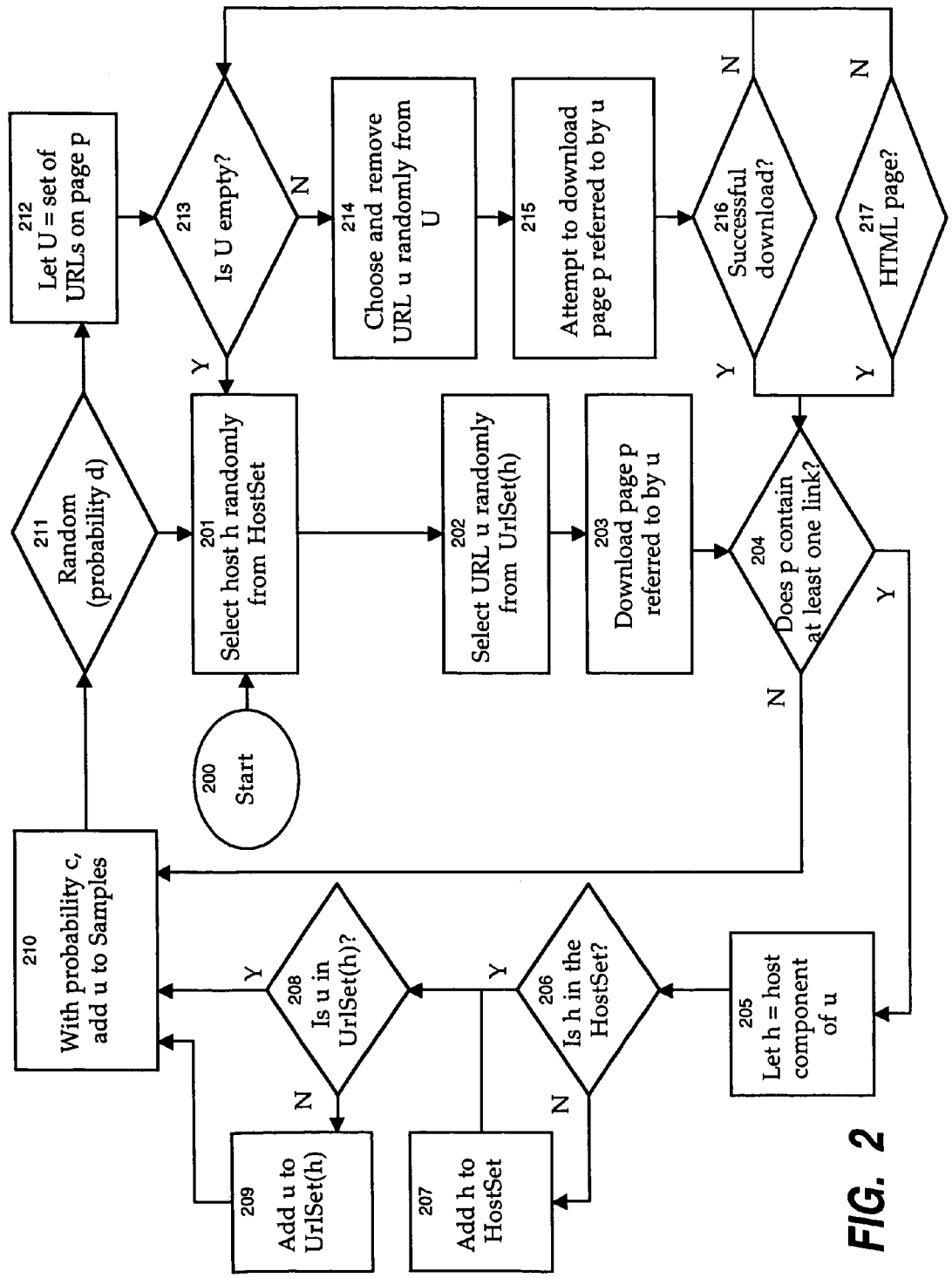
FIG. 2 is a detailed flowchart of a random walk method of sampling pages.

Referring now to FIG. 2, there is shown a detailed flowchart of the random walk method of sampling pages, as followed by each thread in parallel in one embodiment of the present invention. The following variables are shared by all threads:

HostSet, the set of host names discovered so far;

UrlSet(h), the set of Uniform Resource Locators (URLs) or other document identifiers, discovered so far that belong to host h; and Samples, a list of URLs representing the sample sequence.

The system starts 200 by assigning initial values to HostSet, UrlSet, and Samples. For example, HostSet may be set to a popular website such as "www.yahoo.com"; UrlSet("www.yahoo.com") may be set to {"www.yahoo.com"}; UrlSet(h) may be set to { } for all other hosts h; and Samples may be set to [ ].

The system selects 201 a host h uniformly at random from HostSet. Next, it selects 202 a URL u uniformly at random from UrlSet(h), the URL set associated with the selected host. The system then downloads 203 the page p referred to by u, using conventional downloading means.

In 204, the system determines whether page p contains at least one link. If so, steps 205 through 209 are performed. The system assigns 205 h to be equal to the host component of URL u (i.e., that portion of URL u that identifies a particular host). If, in step 206, h is in HostSet, the system, in step 207, adds h to HostSet. If, in step 208, u is in UrlSet(h), the system, in step 209, adds u to UrlSet(h). If in step 204, the system determined that page p did not contain any links, the system proceeds to step 210.

In 210, with probability c, the system adds u to Samples. In 211, the system determines whether to attempt to follow a link on page p (by proceeding to 212) or, with probability d, to return to step 201 to select a new host at random.

In 212, the system assigns U to represent the set of URLs (links) contained in page p. If in 213, U is empty, the system returns to step 201 to select a new host. If in 213, U is not empty, the system proceeds to step 214.

In 214, the system chooses and removes a URL u uniformly at random from U. In 215, the system attempts to download page p referred to by u. If redirects are encountered, they are followed. In one embodiment, the pre-sent invention limits the number of consecutive HTTP redirects to, for example, five, in order to avoid redirect cycles.

In one embodiment, the system favors links that are external to the current host h, so as to increase the likelihood of visiting a large number of different hosts rather than remaining within the same host.

If in 216, the attempted download was unsuccessful, the system returns to step 213. If the download was successful, the system determines 217 whether the downloaded page is an HTML page. In one embodiment, the present invention only uses pages that are HTML pages, and ignores pages that do not have a content type of "text/html" in the HTTP response header. If the page is not HTML, the system returns to step 213.

If the downloaded page is HTML, the system returns to step 204 to begin the cycle again at the next step.

The steps of FIG. 2 can be repeated any number of times, until it is determined that sufficient iterations have been completed or until some system limitation is reached. Based on the results of the random walk, relative quality of individual pages can be determined so that search results can be ranked accordingly. In essence, the more often a page is visited during the random walk, the higher its quality ranking. This implies that pages that are referenced by high-quality pages are also given higher quality rankings. Furthermore, as described previously, relative quality of search engine index quality can be determined by measuring the number of high-quality pages referenced by the search engine index.

It has been found that the two-level random walk yields improved results by avoiding biases in favor of large intraconnected sites. In addition, page quality measurement can occur without requiring indexing of the entire document set in advance, as a ranking can be based on the pages visited so far in the random walk at any given time. Furthermore, individual hosts or other sets of pages can be singled out for exclusion from the random walk, or special weight, or other special treatment, as desired.

Given the random walk described above, a rank measure can be generated for each page to be indexed. In one embodiment, the rank measure is developed from the two-level random walk in a similar manner as described by Page et al. [1] and for conventional random walks. Further details of the PageRank measure are found, for example, in Page et al. [1]; and Page et al. [2], "The Anatomy of a Large-Scale Hypertextual Web Search Engine", in *To Appear: Proceedings of the Seventh International Web Conference* (*WWW* 9, 1998.

Figure 5:
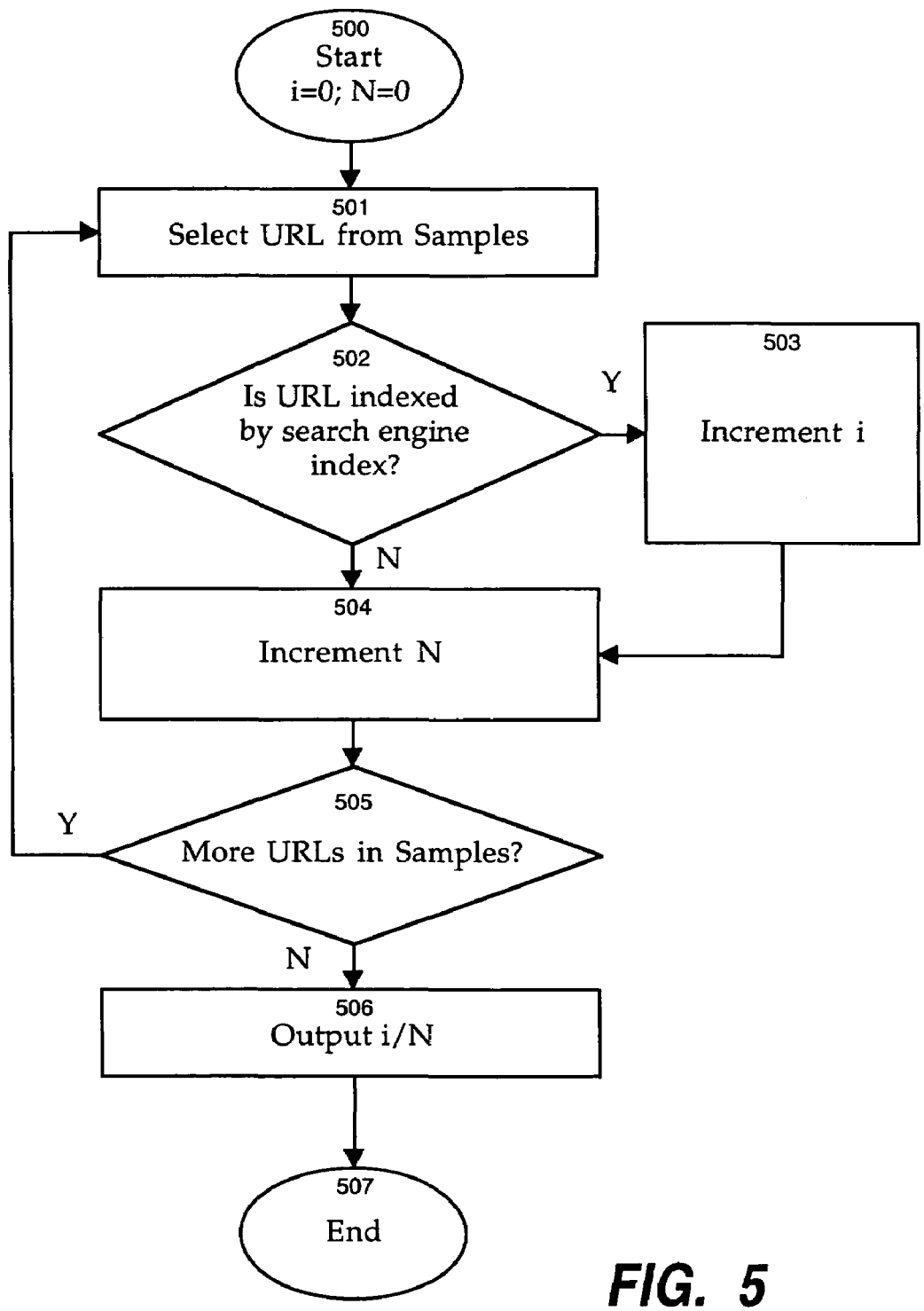
FIG. 5 is a flowchart showing a method of generating a search engine index quality metric from the output of a random walk.

As discussed above, the relative quality of a search engine index can be estimated from the output generated by the random walk, by determining what fraction of pages encountered in the random walk are indexed by the search engine. Referring now to FIG. 5, there is shown a flowchart of a technique for generating a search engine index quality metric, given the output of the random walk described above. The system begins by initializing i=0 and N=0. It then selects 501 a URL from Samples (see above). If in 502, the selected URL is indexed by the search engine index, the system increments i 503. N is incremented 504 regardless of whether the selected URL is indexed. If more URLs exist 505, the system returns to 501. Once all URLs in Samples have been processed, the system outputs i/N 506, which represents the fraction of URLs from Samples that were indexed, and therefore provides an indication of the quality of the search engine index. This value can then be used to compare search engine indexes with one another.

The output of the random walk can also be used to determine a quality metric for each page encountered on the walk. The number of times a particular page is encountered is an indication of the page's quality. This value can be normalized as follows:

$$\text{Quality(page)} = (\text{\# of times page appears})/(\text{Total \# of steps in walk}) \quad (\text{Eq. 7})$$

Thus, the quality is described in terms of the fraction of all steps in the walk that are spent at a particular page.

From the above description, it will be apparent that the invention disclosed herein provides a novel and advantageous system and method of evaluating and ranking search engine indexes and their results. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer-implemented method for randomly walking through a hyper-text-linked document set comprising a plurality of documents, wherein at least a subset of the documents contain a plurality of links to other documents, each document being associated with a host, the method comprising:
    a) selecting a host:
    b) selecting at random a document associated with the host;
    c) retrieving the selected document;
    d) randomly choosing whether to select a random new document;
    e) responsive to choosing to select the random new document:
        e.1) selecting at random a new host from among the previously selected hosts;
        e.2) selecting at random a new document associated with the new host; and
        e.3) retrieving the selected new document;
    f) responsive to choosing not to select the random new document:
        f.1) selecting at random a link in the retrieved document; and
        f.2) retrieving a document referenced by the selected link; and
    g) repeating d), and then conditionally repeating e) or f) depending upon the choosing made in d).

2. The method of claim 1, wherein the document set is the World Wide Web, and wherein each document is a web page.

3. The method of claim 2, wherein each host corresponds to a domain.

4. The method of claim 1, further comprising, concurrently with a) through d), with e) or f), and with g, performing a second two-level random walk through the hypertext-linked document set.

5. The method of claim 1, wherein the repeating of d) and the conditional repeating of e) or f) continues until all documents have been traversed.

6. A computer-implemented method for randomly walking through a hypertext-linked document set comprising a plurality of documents, wherein at least a subset of the documents contain a plurality of links to other documents, each document being associated with a host, the method comprising:
    a) initializing a host set;
    b) initializing a document set for each host in the host set;
    c) selecting at random a host from the host set;
    d) selecting at random a document from the document set of the selected host; and
    e) responsive to the selected document containing at least one link:
        e.1) selecting at random a link from the selected document;
        e.2) selecting a document corresponding to the selected link;
        e.3) selecting a host corresponding to the selected document;
        e.4) adding the selected host to the host set;
        e.5) adding the selected document to the document set of the selected host; and
        e.6) repeating e.1) through e.5) until all links have been traversed.

7. The method of claim 6, wherein:
    e.4) is performed responsive to the selected host not being in the host set; and
    e.5) is performed responsive to the selected document not being in the document set of the selected host.

8. The method of claim 6, wherein the hypertext-linked document set is the World Wide Web, and wherein each document is a web page.

9. The method of claim 8, wherein each host corresponds to a domain.

10. The method of claim 6, further comprising:
f) repeating c) through d), and further conditionally repeating e) if the selected document contains at least one link, until all documents have been traversed.

11. A computer-implemented method for randomly walking through a hypertext-linked document set comprising a plurality of documents, wherein at least a subset of the documents contain a plurality of links to other documents, each document being associated with a host, the method comprising:
  a) initializing a host set;
  b) initializing a document set for each host in the host set;
  c) selecting at random a host from the host set;
  d) selecting at random a document from the document set of the selected host;
  e) randomly choosing whether to select a random new document; and
  f) responsive to choosing not to select a random new document and further responsive to the selected document containing at least one link:
    f.1) selecting at random a link from the selected document;
    f.2) selecting a document corresponding to the selected link;
    f.3) selecting a host corresponding to the selected document;
    f.4) adding the selected host to the host set;
    f.5) adding the selected document to the document set of the selected host; and
    f.6) repeating f.1) through f.5) until all links have been traversed.

12. The method of claim 11, further comprising:
g) repeating c) through e), and further conditionally repeating f) if a random new document is not chosen, until all documents have been traversed.

13. A computer-implemented method for measuring relative quality of a search engine index, comprising:
  a) performing a two-level random walk among documents within a document set, wherein at least a subset of the documents contain a plurality of links to other documents, each document being associated with a host, and wherein performing the two-level random walk comprises;
    a.1) selecting a host;
    a.2) selecting at random a document associated with the host;
    a.3) retrieving the selected document;
    a.4) selecting at random a link in the retrieved document;
    a.5) retrieving a document referenced by the selected link; and
    a.6) repeating a.4) and a.5) until all links have been traversed;
  b) for each document encountered in the random walk, determining whether the document is indexed by the search engine index; and
  c) aggregating the results of b).

14. The method of claim 13, wherein each document contains a plurality of words, and wherein b) comprises, for each document encountered in the random walk:
  b.1) selecting at least one word from the document;
  b.2) performing a query on the search engine index based on the selected at least one word, to obtain search results; and
  b.3) determining whether the document is included in the obtained search results.

15. The method of claim 14, wherein b.1) comprises selecting at least one word based on rarity.

16. A computer-implemented method for measuring relative quality of a search engine index, comprising:
  a) performing a two-level random walk among documents within a document set, by:
    a.1) selecting a host;
    a.2) selecting at random a document associated with the host;
    a.3) retrieving the selected document;
    a.4) randomly choosing whether to select a random new document;
      a.4.1) responsive to choosing to select the random new document:
        a.4.1.1) selecting at random a new host from among the previously selected hosts;
        a.4.1.2) selecting at random a new document associated with the host; and
        a.4.1.3) retrieving the selected new document;
      a.4.2) responsive to choosing not to select the random new document:
        a.4.2.1) selecting at random a link in the retrieved document; and
        a.4.2.2) retrieving a document referenced by the selected link; and
    a.5) repeating a.4), and then conditionally repeating a.4.1) through a.4.1.3) or a.4.2) through a.4.2.2) depending upon the choosing made in a.4);
  b) for each document encountered in the random walk, determining whether the document is indexed by the search engine index; and
  c) aggregating the results of b).

17. The method of claim 16, wherein the repeating of a.4) and the conditional repeating of a.4.1) through a.4.1.3) or a.4.2) through a.4.2.2) continues until all documents have been traversed.

18. A computer-implemented method for measuring relative quality of a search engine index, comprising:
  a) performing a two-level random walk among documents within a document set, wherein at least a subset of the documents contain a plurality of links to other documents, each document being associated with a host, and wherein performing the two-level random walk comprises:
    a.1) initializing a host set;
    a.2) initializing a document set for each host in the host set;
    a.3) selecting at random a host from the host set;
    a.4) selecting at random a document from the document set of the selected host;
    a.5) adding a host that is referenced by a selected link to the host set;
    a.6) adding a document referenced by the selected link to the document set of the selected host;
    a.7) responsive to the selected document containing at least one link:
      a.7.1) selecting at random a link from the selected document;
      a.7.2) selecting a document corresponding to the selected link;
      a.7.3) selecting a host corresponding to the selected document; and
      a.7.4) repeating a.5) through a.8) until all links have been traversed; and
    a.8) responsive to the selected document not containing at least one link, repeating a.3) through a.6), and further conditionally repeating a.7) or a.8), until all documents have been traversed;

b) for each document encountered in the random walk, determining whether the document is indexed by the search engine index; and c) aggregating the results of b).

19. The method of claim 18, wherein:

a.5) is performed responsive to the selected host not being in the host set; and a.6) is performed responsive to the selected document not being in the document set of the selected host.

20. A computer-implemented method for measuring relative quality of a target document in a document set comprising a plurality of documents, wherein at least a subset of the documents contain a plurality of links to other documents, the method comprising:

a) performing a two-level random walk among documents within a document set; and b) determining a quality metric responsive to the number of documents encountered during the two-level random walk that link to the target document, the determining of the quality metric comprising determining a value for:

$$R(p) = d/T + (1-d)\sum_{i=1}^{k} R(p_i)/C(p_i)$$

where:

R(p) is the PageRank of target document p;

$R(p_i)$ is the PageRank of document $p_i$;

T is the total number of documents in the document set;

d is a damping factor such that 0<d<1;

documents $p_i, \ldots, P_k$ each contain at least one link to target document p; and $C(p_i)$ is the number of links out of document $p_i$.

21. The method of claim 20, wherein b) comprises determining a quality metric responsive to the number of documents that link to the target document, and responsive to the quality metric of the linking documents.

22. The method of claim 20, further comprising:

c) determining a quality metric for at least one additional target document; and d) ranking the quality metric of the first target document with respect to the quality metrics of the additional target documents.

23. A computer-implemented method for measuring relative quality of a target document in a document set comprising a plurality of documents, wherein at least a subset of the documents contain a plurality of links to other documents, wherein each document is associated with a host, the method comprising:

a) performing a two-level random walk among documents within a document set by:

a.1) selecting a host;

a.2) selecting at random a document associated with the host;

a.3) retrieving the selected document;

a.4) randomly choosing whether to select a random new document;

a.5) responsive to choosing to select the random new document:

a.5.1) selecting at random a host from among the previously selected hosts;

a.5.2) selecting at random a document associated with the host; and a.5.3) retrieving the selected document;

a.6) responsive to choosing not to select the random new document:

a.6.1) selecting at random a link in the retrieved document; and a.6.2) retrieving a document referenced by the selected link; and a.7) repeating a.4), and then conditionally repeating a.5) through a.5.3) or a.6) through a.6.2) depending upon the choosing made in a.4); and b) determining a quality metric responsive to the number of documents encountered during the two-level random walk that link to the target document.

24. The method of claim 23, wherein the repeating of a.4) and the conditional repeating of a.5) through a.5.3) or a.6) through a.6.2) continues until all documents have been traversed.

25. A computer-implemented method for measuring relative quality of a target document in a document set comprising a plurality of documents, wherein at least a subset of the documents contain a plurality of links to other documents, wherein each document is associated with a host, the method comprising:

a) performing a two-level random walk among documents within a document set, by:

a.1) initializing a host set;

a.2) initializing a document set for each host in the host set;

a.3) selecting at random a host from the host set;

a.4) randomly choosing whether to select a random new host;

a.5) responsive to choosing to select the random new host:

a.5.1) selecting at random a new host from among the previously selected hosts;

a.6) responsive to choosing not to select the random new host:

a.6.1) selecting at random a document from the document set of the selected host; and a.6.2) responsive to the selected document containing at least one link:

a.6.2.1) selecting at random a link from the selected document;

a.6.2.2) selecting a document corresponding to the selected link;

a.6.2.3) selecting a host corresponding to the selected document; and a.6.2.4) adding the selected host to the host set;

a.6.2.5) adding the selected document to the document set of the selected host;

a.6.2.6) repeating a.6.2.1) through a.6.2.5) until all links have been traversed; and a.7) repeating a.3) through a.4), and then conditionally repeating a.5) through a.5.1) or a.6) through a.6.2.6); and b) determining a quality metric responsive to the number of documents encountered during the two-level random walk that link to the target document.

26. The method of claim 25, wherein the repeating of a.3) through a.4) and the conditional repeating of a.5) through a.5.1) or a.6) through a.6.2.6) continues until all documents have been traversed.

27. A computer-implemented method for randomly walking through a hypertext-linked document set comprising a plurality of documents, wherein at least a subset of the documents contain a plurality of links to other documents, each document being associated with a host, the method comprising:

a) selecting a host;
b) selecting at random a document associated with the host;
c) retrieving the selected document;
d) randomly choosing whether to select a random new host;
e) responsive to choosing to select the random new host:
   e.1) selecting at random a new host from among the previously selected hosts; and
   e.2) repeating b) through d), and then conditionally e) through e.2) or f) through f.3 until all documents have been traversed; and
f) responsive to choosing not to select the random new host:
   f.1) selecting at random a link in the retrieved document;
   f.2) retrieving a document referenced by the selected link; and
   f.3) repeating d), and then conditionally e) through e.2) or f) through f.3) until all links have been traversed.

28. A computer-implemented method for measuring relative quality of a target document in a document set comprising a plurality of documents, wherein at least a subset of the documents contain a plurality of links to other documents, the method comprising:
   a) performing a two-level random walk among documents within a document set, by:
      a.1) initializing a host set;
      a.2) initializing a document set for each host in the host set;
      a.3) selecting at random a host from the host set;
      a.4) randomly choosing whether to select a random new host;
      a.5) responsive to choosing to select a random new host:
         a.5.1) selecting at random a new host from among the previously selected hosts;
      a.6) responsive to choosing not to select the random new host:
         a.6.1) selecting at random a document from the document set of the selected host; and
         a.6.2) responsive to the selected document containing at least one link:
            a.6.2.1) selecting at random a link from the selected document;
            a.6.2.2) selecting a document corresponding to the selected link;
            a.6.2.3) selecting a host corresponding to the selected document; and
            a.6.2.4) adding the selected host to the host set;
            a.6.2.5) adding the selected document to the document set of the selected host;
            a.6.2.6) repeating a.6.2.1) through a.6.2.5) until all links have been traversed; and
      a.7) repeating a.3) through a.4), and then conditionally repeating a.5) through a.5.1) or a.6) through a.6.2.6); and
   b) determining a quality metric responsive to the number of documents encountered during the two-level random walk that link to the target document;
   c) determining a quality metric for at least one additional target document; and
   d) ranking the quality metric of the first document with respect to the quality metrics of the additional target documents.

29. The method of claim 28, wherein the repeating of a.3) through a.4) and the conditional repeating of a.5) through a.5.1 or a.6) through a.6.2.6) continues until all documents have been traversed.

30. A computer program product comprising a computer-readable medium having computer-readable code embodied therein for randomly walking through a hypertext-linked document set comprising a plurality of documents, wherein at least a sub-set of the documents contain a plurality of links to other documents, each document being associated with a host, the computer program product comprising:
   a) computer-readable program code devices configured to cause a computer to select a host;
   b) computer-readable program code devices configured to cause a computer to select at random a document associated with the host;
   c) computer-readable program code devices configured to cause a computer to retrieve the selected document;
   d) computer-readable program code devices configured to cause a computer to randomly choose whether to select a random new document;
   e) computer-readable program code devices configured to cause a computer to, responsive to choosing to select the random new document:
      e.1) select at random a new host from among the previously selected hosts; and
      e.2) select at random a new document associated with the host; and
      e.3) retrieve the selected new document;
   f) computer-readable program code devices configured to cause a computer to, responsive to choosing not to select the random new document:
      f.1) select at random a link in the retrieved document; and
      f.2) retrieve a document referenced by the selected link; and
   g) computer-readable program code devices configured to cause a computer to repeat the operations of d) and then conditionally repeat the operations of e) or f) depending on the choice made in d).

31. The computer program product of claim 30, wherein the document set is the World Wide Web, and wherein each document is a web page.

32. The computer program product of claim 30, wherein the computer-readable program code devices are further configured to continue to cause a computer to repeat a.4) and the conditionally repeat a.4.1) through a.4.1.3) or a.4.2) through a.4.2.2) until all documents have been traversed.

33. A computer program product comprising a computer-readable medium having computer-readable code embodied therein for randomly walking through a hypertext-linked document set comprising a plurality of documents, wherein at least a subset of the documents contain a plurality of links to other documents, each document being associated with a host, the computer program product comprising:
   a) computer-readable program code devices configured to cause a computer to initialize a host set;
   b) computer-readable program code devices configured to cause a computer to initialize a document set for each host in the host set;
   c) computer-readable program code devices configured to cause a computer to select at random a host from the host set;
   d) computer-readable program code devices configured to cause a computer to select at random a document from the document set of the selected host; and
   e) computer-readable program code devices configured to cause a computer to, responsive to the selected document containing at least one link:
      e.1) select at random a link from the selected document;
      e.2) select a document corresponding to the selected link;
      e.3) select a host corresponding to the selected document; and e.4) add the selected host to the host set;
e.5) add the selected document to the document set of the selected host; and
e.6) repeat the operations of e.1) through e.5) until all links have been traversed.

34. The computer program product of claim 33, wherein:
the computer-readable program code devices configured to cause a computer to add the selected host to the host set operate responsive to the selected host not being in the host set; and
the computer-readable program code devices configured to cause a computer to add the selected document to the document set of the selected host operate responsive to the selected document not being in the document set of the selected host.

35. The computer program product of claim 33, wherein the hypertext-linked document set is the World Wide Web, and wherein each document is a web page.

36. The computer program product of claim 35, wherein each host corresponds to a domain.

37. The computer program product of claim 33, further comprising:
f) computer readable program code devices configured to cause a computer to repeat c) through d), and further conditionally repeat e) if the selected document contains at least one link, until all documents have been traversed.

38. A computer program product comprising a computer-readable medium having computer-readable code embodied therein for randomly walking through a hypertext-linked document set comprising a plurality of documents, wherein at least a sub-set of the documents contain a plurality of links to other documents, each document being associated with a host, the computer program product comprising:
a) computer-readable program code devices configured to cause a computer to initialize a host set;
b) computer-readable program code devices configured to cause a computer to initialize a document set for each host in the host set;
c) computer-readable program code devices configured to cause a computer to select at random a host from the host set;
d) computer-readable program code devices configured to cause a computer to select at random a document from the document set of the selected host;
e) computer-readable program code devices configured to cause a computer to randomly choose whether to select a random new document; and
f) computer-readable program code devices configured to cause a computer to, responsive to choosing not to select a random new document, and further responsive to the selected document containing at least one link:
f.1) select at random a link from the selected document;
f.2) select a document corresponding to the selected link;
f.3) select a host corresponding to the selected document; and
f.4) add the selected host to the host set;
f.5) add the selected document to the document set of the selected host; and
f.6) repeat the operations of f.1 through f.5) until all links have been traversed.

39. The computer program product of claim 38, further comprising:
g) computer readable program code devices configured to cause a computer to repeat c) through e), and further conditionally repeat f) if a random new document is not chosen, until all documents have been traversed.

40. A computer program product comprising a computer-readable medium having computer-readable code embodied therein for measuring relative quality of a search engine index, the computer program product comprising:
a) computer-readable program code devices configured to cause a computer to perform a two-level random walk among documents within a document set, wherein at least a subset of the documents contain a plurality of links to other documents, each document being associated with a host, and wherein the computer-readable program code devices configured to cause a computer to perform a two-level random walk comprise:
a.1) computer-readable program code devices configured to cause a computer to select a host;
a.2) computer-readable program code devices configured to cause a computer to select at random a document associated with the host;
a.3) computer-readable program code devices configured to cause a computer to retrieve the selected document;
a.4) computer-readable program code devices configured to cause a computer to select at random a link in the retrieved document;
a.5) computer-readable program code devices configured to cause a computer to retrieve a document referenced by the selected link; and
a.6) computer-readable program code devices configured to cause a computer to repeat the operations of a.4) and a.5) until all links have been traversed;
b) computer-readable program code devices configured to cause a computer to, for each document encountered in the random walk, determine whether the document is indexed by the search engine index; and
c) computer-readable program code devices configured to cause a computer to aggregate the results of the operations of b).

41. The computer program product of claim 40, wherein each document contains a plurality of words, and wherein the computer-readable program code devices configured to cause a computer to determine whether the document is indexed by the search engine index comprise computer-readable program code devices configured to, for each document encountered in the random walk:
b.1) select at least one word from the document;
b.2) perform a query on the search engine index based on the selected at least one word, to obtain search results; and
b.3) determine whether the document is included in the obtained search results.

42. The computer program product of claim 41, wherein the computer-readable program code devices configured to select at least one word from the document comprise computer-readable program code devices configured to select at least one word based on rarity.

43. A computer program product comprising a computer-readable medium having computer-readable code embodied therein for measuring relative quality of a search engine index, the computer program product comprising:
a) computer-readable program code devices configured to cause a computer to perform a two-level random walk among documents within a document set, wherein at least a subset of the documents contain a plurality of links to other documents, each document being associated with a host, and wherein the computer-readable program code devices configured to cause a computer to perform a two-level random walk comprise:

a.1) computer-readable program code devices configured to cause a computer to initialize a host set;

a.2) computer-readable program code devices configured to cause a computer to initialize a document set for each host in the host set;

a.3) computer-readable program code devices configured to cause a computer to select at random a host from the host set;

a.4) computer-readable program code devices configured to cause a computer to select at random a link from a document in the document set of the selected host;

a.5) computer-readable program code devices configured to cause a computer to add a host referenced by the link to the host set;

a.6) computer-readable program code devices configured to cause a computer to add a document referenced by the link to the document set of the selected host;

a.7) computer-readable program code devices configured to cause a computer to, responsive to the selected document containing at least one link:

a.7.1) select at random a link from the selected document;

a.7.2) select a document corresponding to the selected link;

a.7.3) select a host corresponding to the selected document; and a.7.4) repeat the operations of a.5) through a.8) until all links have been traversed; and a.8) computer-readable program code devices configured to cause a computer to, responsive to the selected document not containing at least one link, repeat the operations of a.3) through a.6), and further conditionally repeating a.7) or a.8), until all documents have been traversed;

b) computer-readable program code devices configured to cause a computer to, for each document encountered in the random walk, determine whether the document is indexed by the search engine index; and c) computer-readable program code devices configured to cause a computer to aggregate the results of the operations of b).

44. The computer program product of claim 43, wherein:
the computer-readable program code devices configured to cause a computer to add the selected host to the host set are configured to cause a computer to add the selected host responsive to the selected host not being in the host set; and the computer-readable program code devices configured to cause a computer to add the selected document to the document set of the selected host are configured to cause a computer to add the selected document responsive to the selected document not being in the document set of the selected host.

45. A computer program product comprising a computer-readable medium having computer-readable code embodied therein for measuring relative quality of a target document in a document set comprising a plurality of documents, wherein at least a subset of the documents contain a plurality of links to other documents, the computer program product comprising:

computer-readable program code devices configured to cause a computer to perform a two-level random walk among documents within a document set; and computer-readable program code devices configured to cause a computer to determine a quality metric responsive to the number of documents encountered during the two-level random walk that link to the target document and to further determine a value for:

$$R(p) = d/T + (1-d)\sum_{i=1}^{k} R(p_i)/C(p_i)$$

where:
R(p) is the PageRank of target document p;
$R(p_i)$ is the PageRank of document $p_i$;
T is the total number of documents in the document set;
d is a damping factor such that 0<d<1;
documents $p_1, \ldots, p_k$ each contain at least one link to target document p; and
$C(p_i)$ is the number of links out of document $p_i$.

46. The computer program product of claim 45, wherein the computer-readable program code devices configured to cause a computer to determine a quality metric comprise computer-readable program code devices configured to cause a computer to determine a quality metric responsive to the number of documents that link to the target document, and responsive to the quality metric of the linking documents.

47. The computer program product of claim 45, further comprising:

c) computer-readable program code devices configured to cause a computer to determine a quality metric for at least one additional target document; and d) computer-readable program code devices configured to cause a computer to rank the quality metric of the first target document with respect to the quality metrics of the additional target documents.

48. A computer program product comprising a computer-readable medium having computer-readable code embodied therein for measuring relative quality of a target document in a document set comprising a plurality of documents, wherein at least a subset of the documents contain a plurality of links to other documents, and wherein each document is associated with a host, the computer program product comprising:

computer-readable program code devices configured to cause a computer to perform a two-level random walk among documents within a document set, by:

a.1) selecting a host;

a.2) selecting at random a document associated with the host;

a.3) retrieving the selected document;

a.4) randomly choosing whether to select a random new document;

a.5) responsive to choosing to select the random new document:

a.5.1) selecting at random a host from among the previously selected hosts; and a.5.2) selecting at random a document associated with the host; and a.5.3) retrieving the selected document;

a.6) responsive to choosing not to select the random new document:

a.6.1) selecting at random a link in the retrieved document; and a.6.2) retrieving a document referenced by the selected link; and a.7) repeating the operations of a.4), and then conditionally repeating the operations of a.5) through a.5.3) or a.6) through a.6.2) depending upon the choosing made in a.4); and computer-readable program code devices configured to cause a computer to determine a quality metric responsive to the number of documents encountered during the two-level random walk that link to the target document.

49. The computer program product of claim 48, wherein the repeating of a.4) and the conditional repeating of a.5) through a.5.3) or a.6) through a.6.2) continues until all documents have been traversed.

50. A computer program product comprising a computer-readable medium having computer-readable code embodied therein for measuring relative quality of a target document in a document set comprising a plurality of documents, wherein at least a subset of the documents contain a plurality of links to other documents, wherein each document is associated with a host, the computer program product comprising:
   computer-readable program code devices configured to cause a computer to perform a two-level random walk among documents within a document set, by:
      a.1) initializing a host set;
      a.2) initializing a document set for each host in the host set;
      a.3) selecting at random a host from the host set;
      a.4) randomly choosing whether to select a random new host;
      a.5) responsive to choosing to select the random new host:
         a.5.1) selecting at random a host from among the previously selected hosts;
      a.6) responsive to choosing not to select the random new host:
         a.6.1) selecting at random a document from the document set of the selected host;
         a.6.2) adding the selected host to the host set;
         a.6.3) adding the selected document to the document set of the selected host;
         a.6.4) responsive to the selected document containing at least one link:
            a.6.4.1) selecting at random a link from the selected document;
            a.6.4.2) selecting a document corresponding to the selected link;
            a.6.4.3) selecting a host corresponding to the selected document; and
            a.6.4.4) repeating the operations of a.6.2) through a.6.4.3) until all links have been traversed; and
      a.7) repeating the operations of a.3) through a.4), and then conditionally repeating a.5) through a.5.1) or a.6) through a.6.4.4; and
   computer-readable program code devices configured to cause a computer to determine a quality metric responsive to the number of documents encountered during the two-level random walk that link to the target document.

51. The computer program product of claim 50, wherein the repeating of a.3) through a.4) and the conditional repeating of a.5) through a.5.1) or a.6) through a.6.4.4) continues until all documents have been traversed.

52. A computer program product comprising a computer-readable medium having computer-readable code embodied therein for randomly walking through a hypertext-linked document set comprising a plurality of documents, wherein at least a subset of the documents contain a plurality of links to other documents, each document being associated with a host, the computer program product comprising:
   a) computer-readable program code devices configured to cause a computer to select a host;
   b) computer-readable program code devices configured to cause a computer to select at random a document associated with the host;
   c) computer-readable program code devices configured to cause a computer to retrieve the selected document;
   d) computer-readable program code devices configured to cause a computer to randomly choose whether to select a random new host;
   e) computer-readable program code devices configured to cause a computer to, responsive to choosing to select the random new host:
      e.1) select at random a new host from among the previously selected hosts; and
      e.2) repeat the operations of b) through d) and then conditionally e) through e.2) or f) through f.3) until all documents have been traversed; and
   f) computer-readable program code devices configured to cause a computer to, responsive to choosing not to select the random new host:
      f.1) select at random a link in the retrieved document;
      f.2) retrieve a document referenced by the selected link; and
      f.3) repeat the operations of d), and then conditionally e) through e.2) or f) through f.3) until all links have been traversed.

53. A computer program product comprising a computer-readable medium having computer-readable code embodied therein for measuring relative quality of a target document in a document set comprising a plurality of documents, wherein at least a subset of the documents contain a plurality of links to other documents, the computer program product comprising:
   a) computer-readable program code devices configured to cause a computer to perform a two-level random walk among documents within a document set by:
      a.1) initializing a host set;
      a.2) initializing a document set for each host in the host set;
      a.3) selecting at random a host from the host set;
      a.4) randomly choosing whether to select a random new host;
      a.5) responsive to choosing to select a random new host:
         a.5.1) selecting at random a new host from among the previously selected hosts;
      a.6) responsive to choosing not to select the random new host:
         a.6.1) selecting at random a link from a document in the document set of the selected host;
         a.6.2) adding the host referenced by the link to the host set;
         a.6.3) adding the document referenced by the link to the document set of the selected host;
         a.6.4) responsive to the selected document containing at least one link:
            a.6.4.1) selecting at random a link from the selected document;
            a.6.4.2) selecting a document corresponding to the selected link;
            a.6.4.3) selecting a host corresponding to the selected document;
            a.6.4.4) repeating the operations of a.6.2) through a.6.4.3) until all links have been traversed; and
      a.7) responsive to the selected document not containing at least one link, repeating the operations of a.3) through a.4), and then conditionally repeating a.5) through a.5.1) or a.6) through a.6.4.4);

b) computer-readable program code devices configured to cause a computer to determine a quality metric responsive to the number of documents encountered during the two-level random walk that link to the target document;

c) computer-readable program code devices configured to cause a computer to determine a quality metric for at least one additional target document; and d) computer-readable program code devices configured to cause a computer to rank the quality metric of the first document with respect to the quality metrics of the additional target documents.

54. The computer program product of claim 53, wherein the repeating of a.3) through a.4) and the conditional repeating a.5) through a.5.1) or a.6) through a.6.4.4) continues until all documents have been traversed.

55. A system for randomly walking through a hypertext-linked document set comprising a plurality of documents, wherein at least a subset of the documents contain a plurality of links to other documents, each document being associated with a host, the system comprising:

a) a host selector;

b) a random document selector, coupled to the host selector, for selecting at random a document associated with the host;

c) a document retriever, coupled to the random document selector, for retrieving the selected document; and d) a link selector, coupled to the document retriever;

wherein, responsive to the host selector randomly choosing to select a random host:

the host selector selects at random a host from among the previously selected hosts;

the random document selector selects at random a document associated with the host; and the document retriever retrieves the selected document; and wherein, responsive to the host selector randomly choosing not to select a random host:

the link selector selects at random a link in the retrieved document; and the document retriever retrieves a document referenced by the selected link; and wherein the link selector, the random document selector, and the document retriever repeat their respective operations until all links have been traversed.

* * * * *

UNITED STATES PATENT AND TRADEMARK OFFICE
CERTIFICATE OF CORRECTION

| | | |
|---|---|---|
| PATENT NO. | : 7,451,388 B1 | Page 1 of 1 |
| APPLICATION NO. | : 09/392170 | |
| DATED | : November 11, 2008 | |
| INVENTOR(S) | : Monika R. Henzinger et al. | |

It is certified that error appears in the above-identified patent and that said Letters Patent is hereby corrected as shown below:

In column 7, line 21, delete "intra-host" and insert -- intraconnected host --, therefor.

In column 9, line 20, delete "(WWW 9," and insert -- (WWW 98), --, therefor.

In column 10, line 27, in Claim 4, after "and with" delete "g," and insert -- g), --, therefor.

In column 15, line 9, in Claim 27, delete "f.3" and insert -- f.3) --, therefor.

In column 17, line 60, in Claim 38, after "operations of" delete "f.1" and insert -- f.1) --, therefor.

In column 21, line 50, in Claim 50, delete "a.6.4.4" and insert -- a.6.4.4) --, therefor.

Signed and Sealed this

Twenty-fifth Day of August, 2009

David J. Kappos
*Director of the United States Patent and Trademark Office*